(12) United States Patent
Vicker et al.

(10) Patent No.: US 6,649,092 B2
(45) Date of Patent: Nov. 18, 2003

(54) PLASTIC LAMINATED INFRARED OPTICAL ELEMENT

(75) Inventors: Del Vicker, Howey-In-The-Hills, FL (US); Richard Leblanc, Orlando, FL (US)

(73) Assignee: Lockheed Martin Corporation, Bethesda, MD (US)

(*) Notice: Subject to any disclaimer, the term of this patent is extended or adjusted under 35 U.S.C. 154(b) by 0 days.

(21) Appl. No.: 09/824,764

(22) Filed: Apr. 4, 2001

(65) Prior Publication Data

US 2002/0179235 A1 Dec. 5, 2002

(51) Int. Cl.[7] .............................................. B29D 11/00
(52) U.S. Cl. .......................................... 264/1.7; 264/2.7
(58) Field of Search ................................ 156/60, 306.3, 156/295; 264/1.1, 1.7, 2.7; 428/411.1; 351/159; 359/350, 355, 356

(56) References Cited

U.S. PATENT DOCUMENTS

| | | | |
|---|---|---|---|
| 4,566,930 A | 1/1986 | Uehara | 156/280 |
| 4,623,496 A | 11/1986 | Verhoeven et al. | 264/1.7 |
| 4,756,972 A | 7/1988 | Kloosterboer et al. | 428/417 |
| 4,957,663 A | 9/1990 | Zwiers et al. | 264/1.4 |
| 5,219,497 A | 6/1993 | Blum | 264/1.4 |
| 5,232,637 A | 8/1993 | Dasher et al. | 264/1.3 |
| 5,324,586 A * | 6/1994 | Klocek et al. | 428/412 |
| 5,343,260 A | 8/1994 | Henry et al. | 351/159 |
| 5,366,668 A | 11/1994 | Cuthbertson et al. | 264/1.8 |
| 5,458,820 A | 10/1995 | Lefebvre | 264/1.7 |
| 5,573,824 A | 11/1996 | Klocek et al. | |
| 5,629,074 A | 5/1997 | Klocek et al. | |
| 5,730,911 A | 3/1998 | Cano et al. | 264/1.1 |
| 5,733,483 A | 3/1998 | Soane et al. | 264/1.7 |
| 5,800,744 A | 9/1998 | Munakata | 264/1.7 |
| 5,859,685 A | 1/1999 | Gupta et al. | 359/159 |
| 5,861,934 A | 1/1999 | Blum et al. | 351/169 |
| 5,897,381 A | 4/1999 | Aronowitz et al. | |
| 5,973,827 A | 10/1999 | Chipper | |
| 6,027,672 A | 2/2000 | Weitzel et al. | 264/1.36 |

\* cited by examiner

Primary Examiner—Michael W. Ball
Assistant Examiner—John T. Haran
(74) Attorney, Agent, or Firm—Burns, Doane, Swecker & Mathis, LLP

(57) ABSTRACT

A laminated optical element has an IR transmissive substrate and a laminated IR transmissive polymeric layer on at least one surface of the IR transmissive substrate. The polymer layer may be a fluoropolymer or polyethylene and has an aspheric/diffractive surface. The polymer layer is affixed to the substrate by adhesive or, alternatively, the polymer layer is formed directly on the substrate resulting in a unitary optical element that is IR transmissive.

20 Claims, 2 Drawing Sheets

PLASTIC LAMINATED INFRARED OPTICAL ELEMENT

BACKGROUND

1. Field of the Invention

Figure 1:
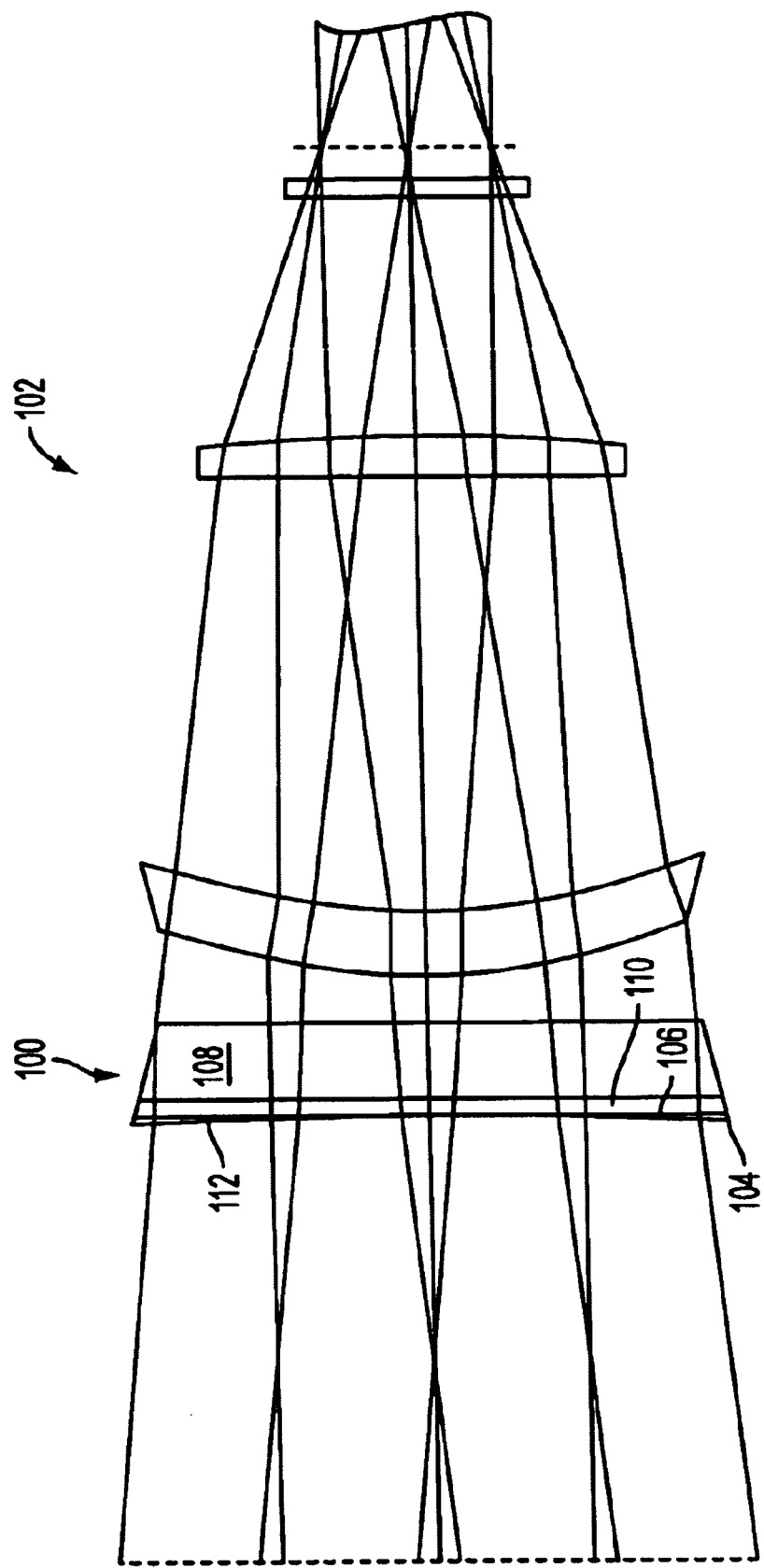

The present device is directed generally to infrared (IR) optical systems. More specifically, the present invention is directed to IR optical systems with optical elements with plastic optically significant surface layers.

2. Background Information

Infrared electromagnetic radiation refers to the region of the electromagnetic spectrum between wavelengths of approximately 0.7 and 1000 $\mu$m, which is between the upper limit of the visible radiation region and the lower limit of the microwave region. Infrared radiation is sometimes broken into three sub-regions: near-infrared radiation with wavelengths between 0.7–1 $\mu$m, intermediate-infrared radiation with wavelengths between 1–20 $\mu$m, and far-infrared radiation with wavelengths between 20–1000 $\mu$m. The intermediate-infrared radiation region is often further broken into the short-wave (SWIR) region with wavelength limits of 1–3 $\mu$m, mid-wave (MWIR) region with wavelength limits of 3–5 $\mu$m, and the long-wave (LWIR) region with wavelength limits of 8–14 $\mu$m.

Infrared radiation is produced principally by electromagnetic emissions from solid materials as a result of thermal excitation. The detection of the presence, distribution, and direction of infrared radiation requires techniques which are unique to this spectral region. The wavelengths of infrared radiation are such that optical methods may be used to collect, filter, and direct the infrared radiation. Photosensitive devices convert heat, or infrared electromagnetic radiation, into electrical energy and are often used as infrared sensitive elements. Such photosensitive devices respond in proportion to the number of infrared photons within a certain range of wavelengths to provide electrical energy.

An infrared optical element is transmissive to the wavelengths of radiation to be detected. Materials for the lenses are wavelength matched to the desired spectrum coverage. Although suitable materials may be selected based on the range of IR wavelengths, other material characteristics can impact the manufacturing of IR lenses. For example, the characteristics of silicon are advantageous for use as the material for IR lenses. Silicon can be cut into the desired lens geometry using a diamond point turning tool. However, the hardness of silicon results in slow material removal and wears the diamond tool faster than other IR materials like germanium. In extreme cases, the cost of manufacturing silicon into IR lenses can negate the cost savings from the bulk material. Therefore, a manufacturing process for IR lenses that is inexpensive and quick is desirable.

SUMMARY OF THE INVENTION

Exemplary embodiments of the present invention are directed to providing a laminated optical element with a polymer layer affixed to a substrate. The polymer layer has at least one optically significant surface.

In accordance with exemplary embodiments, a laminated optical element has a polymer layer disposed onto a first surface of a substrate made from a material that is essentially transparent in a desired IR range. The polymer layer is affixed with adhesive to the substrate and is formed into an optically significant surface. The polymer layer and the adhesive are each sufficiently thin to be at least 10%, preferably 30%, and most preferably 50% average normalized transmissive across the desired IR range. Alternatively, the polymer layer is bonded to the substrate or formed directly onto the substrate by molding or polymerization.

A method to adhere a polymer to a substrate is provided. Adhesive is applied to a first surface of a substrate and a polymer layer is compressively held to the first surface until the adhesive cures. Alternatively, the polymer layer is bonded to the first surface of a substrate by, for example, melting. The polymer layer is then manufactured with a desired prescription surface. Exemplary materials for the substrate are IR transmissive in a desired wavelength range and include silicon. Exemplary materials for the polymer layer are at least 30% IR transmissive when sufficiently thin and include fluoropolymers and polyethylene.

BRIEF DESCRIPTION OF THE DRAWING FIGURES

Figure 2:
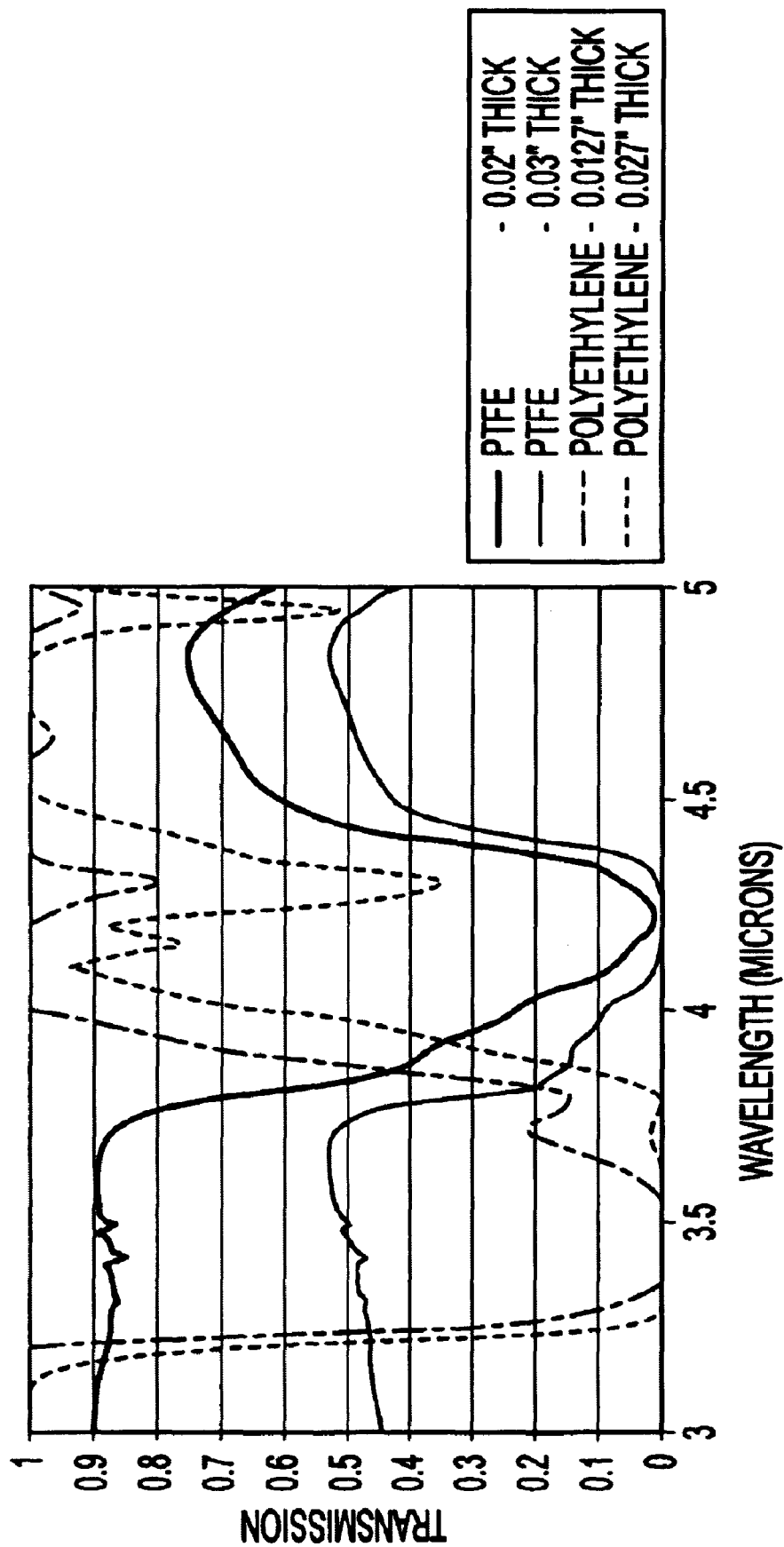

Other objects and advantages of the invention will become apparent from the following detailed description of preferred embodiments in connection with the accompanying drawings in which like numerals designate like elements and in which:

FIG. 1 is a schematic representation of the line trace of energy in a first embodiment of optical components in which a flat substrate has a polymer layer affixed to a surface with adhesive; and FIG. 2 is a plot of normalized transmission versus wavelength for several polymers.

DETAILED DESCRIPTION OF THE PREFERRED EMBODIMENTS

FIG. 1 shows an exemplary embodiment of a laminated optical element 100 in an optical arrangement 102. The laminated optical element 100 has a polymer layer 104 affixed to a first surface 106 of a substrate 108. Examples of polymers suitable for the polymer layer include fluoropolymers and polyethylene. Generally, polymers are not IR transmissive in the bulk. However, for some polymers at thickness less than 0.03", the average normalized transmission in the wavelength region of 3–5 $\mu$m is greater than 50%. Amongst the fluoropolymers, specific examples of suitable polymers include polytetrafluorethylene (PTFE), fluoroethylene propylene (FEP), polyvinylidine fluoride (PVDF), per fluor alkoxy, or ethylene tetrafluoroethylene.

FIG. 2 is a plot of normalized transmission versus wavelength for PTFE and polyethylene at two thickness obtained on a spectrophotometer. Table 1 shows the average normalized transmission over the band for these polymers and includes data adjusted for the atmospheric absorption band (4.19 to 4.45 $\mu$m) in the mid-wave IR region. The fluoropolymers have the best average transmission over the band. This is due to fewer carbon hydrogen bonds or in the case of PTFE no carbon hydrogen bonds. The carbon hydrogen bonds account for the large absorption regions in the spectra of the other polymers.

TABLE 1

| Polymer/Thickness | Average Transmission (excludes atmospheric absorption band) |
|---|---|
| PTFE/0.02 | 67% |
| PTFE/0.03 | 39% |
| Polyethylene/0.0127" | 67% |
| Polyethylene/0.027" | 55% |

The polymer layer 104 can be affixed to the first surface 106 of the substrate 108 with an adhesive 110. Polymer adhesion is an important factor in manufacturing a laminated optical element 100. The polymer must be able to stick and stay on the substrate 108 without peeling or adding a large amount of residual stress in the polymer layer 104 that can cause optical distortions.

Adhesion difficulties can be encountered due to the polymers inherent molecular structure. Several techniques can be used to improve the adhesion properties of these materials to substrates. In a first example, the surface energy state of the polymer can be increased thus increasing the number of electrons available for bonding by placing them in higher energy states. This can be done at the surface of the polymer layer to be bonded using corona discharge, rubbing with an open flame, or by fluorination etching. In a second example, the surface area of the substrate is increased by methods such as etching or sand blasting. Once both the polymer layer surface and the substrate surface have been treated, an adhesive or bonding process can be used to affix the polymer layer and the substrate together.

An adhesive to be used in the laminated optical element 100 has to be IR transmissive at the thickness utilized. Examples of suitable adhesives include Norland® Optical Adhesive NOA 72, NOA 76, or NOA 67 available from Norland Products, Inc. of Cranbury, N.J. The thickness of the adhesive is less than 0.001" and the adhesive is sufficiently thin to be at least 10%, preferably 30%, and most preferably 50% IR average normalized transmissive across the desired IR range.

Other adhesive methods can be used to affix a polymer layer 104 on a substrate 108. For example, the polymer layer 104 can be bonded to the first surface 106 of the substrate 108 by a melt process. In a melt process, elevated temperatures are used to activate the polymer layer 104 to adhere to the substrate 108. This adhesion may by a contact bond or a chemical bond, depending on the materials utilized.

Alternatively, non-adhesive methods can be used to affix a polymer layer 104 on a substrate 108. Examples of non-adhesive processes include direct molding and direct polymerization. In direct molding, the surface of the substrate is exposed to a cavity into which the polymer is added in solution or melt form. The polymer then cures to hard adherent polymer layer by a polymer specific. Examples of direct molding techniques include extrusion and examples of curing techniques include exposure to radiation, exposure to temperature, and exposure to oxidizing or reductive atmosphere. In direct polymerization, the surface of substrate is exposed to a cavity that acts as a reservoir for a polymer solution. Upon exposure to thermal, chemical, or photochemical initiators, a polymerization reaction occurs resulting in a hard adherent polymer layer on the surface of the substrate.

The first surface of the laminated optical element is manufactured into an optically significant surface. The optically significant surface can be formed by any suitable method. For example, the polymer layer can be formed into an optically significant surface by molding the polymer layer or the optically significant surface can be formed by machining, such as by cutting, grinding, or polishing. As used herein, optically significant surface is any surface profile that transmits a desired wavelength of energy and shapes the wavefront of energy. Examples of optically significant surfaces include flat, spherical, aspherical, and kinoform surfaces.

An optically significant surface can be mathematically defined by:

$$H(x) = \frac{Cx^2}{1+\sqrt{1-C^2(k+1)x^2}} + ax^4 + bx^6 + cx^8 + dx^{10} - \frac{(\lambda L_1 - (H_2 Y^2 + H_4 Y^4 + H_6 Y^6 + H_8 Y^8 + H_{10} Y^{10}))}{(N_\lambda - 1)} \quad \text{Eq. 1}$$

where $C=1/r$, $r$=radius of curvature, $k$=conic coefficient, a, b, c, and d are aspheric coefficients, $\lambda$=wavelength of the kinoform design, $N_\lambda$=index of refraction of the material at $\lambda$, $L_i$=zone number={0, 1, 2, . . . , n−1, n}, and $H_2$, $H_4$, $H_6$, $H_8$, and $H_{10}$ are coefficients of the kinoform.

There is a correspondence between the conic coefficient of Eq. 1 and the geometric surface profile. Table 2 illustrates this correspondence.

TABLE 2

Correspondence between k and the type of profile

| Value of k | Type of Profile |
|---|---|
| >0 | ellipse |
| =0 | sphere |
| −1< k <0 | ellipse |
| =−1 | parabola |
| <−1 | hyperbola |

In practice, one skilled in the art could utilize commercially available optical design software to obtain suitable values for the coefficients of Eq. 1, including the aspherical and kinoform coefficients. An example of one such optical design software package is "CODE V©" available from Optical Research Associates of Pasadena, Calif. One skilled in the art could input information including, for example, image size, focal distance, energy distribution across the detector and determine the optimized values for the coefficients of Equation 1. Examples of suitable coefficients for use in an infrared optical system in keeping with this invention are shown in Table 3.

Table 3 is a first embodiment of an optical prescription for the laminated optical element 100. This prescription is for a laminated optical element 100 with a polyethylene polymer layer 104 on a flat silicon substrate 108.

TABLE 3

| Surfaces of Substrate Radius of Curvature | |
|---|---|
| $C_{\text{front surface}}$ | 0 |
| $C_{\text{back surface}}$ | 0 |
| Surfaces of Polyethylene | |
| Thickness | 0.0127 mm |
| Radius of Curvature | |
| C | 0 |
| Conic Coefficient | |
| k | 0 |
| Aspheric Coefficents | |
| a | −3.07779 × 10 − 6 |
| b | −1.66582 × 10 − 9 |
| c | 0 |
| d | 0 |
| Kinoform Coefficents | |
| $H_2$ | 1.139704342 × 10 − 4 |
| $H_4$ | −8.963867630 × 10 − 8 |
| $H_6$ | 0 |

TABLE 3-continued

| | |
|---|---|
| $H_8$ | 0 |
| $H_{10}$ | 0 |
| Wavelength | |
| $\lambda$ | 4 µm |
| $L_i$ | 0, 1, . . . , 5 |

The prescription surface 112 of the polymer layer 104 can be formed with a computer numeric controlled diamond point turning machine known in the art of ophthalmic lens. An example of a computer numeric controlled diamond point turning machine is Precitech's Nanoform® 200, available from Precitech of Keene, N.H. Alternatively, the prescription surface 112 can be formed in conjunction with the direct molding or direct polymerization non-adhesive techniques for affixing the polymer layer 104 to the substrate 108.

The substrate 108 can be any material that is IR transmissive in the desired IR wavelength range. For example, silicon is IR transmissive in the intermediate-infrared radiation region from about 1 to 12 µm. Additional materials that have transmission regions from about 1 to 14 µm may be found in *Infrared Handbook* by Wolfe and Zissis, Office of Naval Research, 1978, p. 7–17, the contents of which are incorporated herein by reference. Other prefered IR transmissive materials suitable for the substrate 108 are fused silica, crystal quartz, spinel, magnesium flouride, magnesium oxide, arsenic trisulfide glass, gallium arsenide, silicon, zinc selenide, zinc sulfide, or germanium.

In the FIG. 1 embodiment, the laminated optical element 100 is shown to include a polymer layer 104 affixed to a first surface 106 of a substrate 108. The polymer layer 104 is polyethylene affixed with NOA 72 to a silicon substrate 108. The NOA 72 is applied to the first surface 106 of the substrate 108 and the polymer layer 104 is held in place under pressure until the NOA 72 cures. The thickness of the NOA 72 is less than 0.001". The prescription of the laminated optical element 100 is given in Table 3. The laminated optical element of FIG. 1 has a focal length of 50 mm and an f/# of 2.6.

Those skilled in the art will appreciate that although the laminated optical element 100 has been described in conjunction with a fluoropolymer or polyethylene polymer layer on a silicon substrate, any polymer and substrate combination which allowed transmission of the desired wavelengths of IR energy can be fabricated using the methods of the invention.

A method of forming a laminated optical element applies an adhesive to a first surface of a substrate. A polymer layer is compressively held to the first surface until the adhesive cures. A prescription surface is manufactured with a computer numeric controlled diamond point turning machine. Alternatively, the polymer layer may be formed on the substrate by other adhesive processes or by non-adhesive methods. Non-adhesive methods can form the prescription surface either with a computer numeric controlled diamond point turning machine or directly during the formation of the polymer layer.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A method of producing a laminated optical element comprising the steps of:

disposing a polymer layer onto at least a first surface of a substrate made from a material that is essentially transparent in a desired IR range; and forming the polymer layer into an optically significant surface.

2. The method of claim 1, wherein the optically significant surface is spherical, aspherical, a kinoform, or combinations thereof.

3. The method of claim 1, wherein the polymer layer is less than 0.03" thick.

4. The method of claim 1, wherein the polymer layer is sufficiently thin to be at least 30% average normalized transmissive across the desired IR range.

5. The method of claim 1, wherein disposing the polymer layer is laminating the layer onto the first surface with an adhesive that is sufficiently thin to be at least 10% IR average normalized transmissive across the desired IR range.

6. The method of claim 5, wherein disposing the polymer layer is laminating the layer onto the first surface with an adhesive that is sufficiently thin to be at least 30% IR average normalized transmissive across the desired IR range.

7. The method of claim 6, wherein disposing the polymer layer is laminating the layer onto the first surface with an adhesive that is sufficiently thin to be at least 50% IR average normalized transmissive across the desired IR range.

8. The method of claim 1, wherein disposing the polymer layer is directly polymerizing the layer onto the first surface.

9. The method of claim 1, wherein disposing the polymer layer is directly molding the layer onto the first surface.

10. The method of claim 9, wherein the polymer layer is formed into an optically significant surface by molding the polymer layer.

11. The method of claim 1, wherein the optically significant surface is formed by machining.

12. The method of claim 11, wherein machining is cutting, grinding, or polishing.

13. The method of claim 1, wherein the first surface is essentially flat.

14. The method of claim 1, wherein the first surface receives IR radiation directly from a source.

15. The method of claim 1, wherein the material that is essentially transparent in a desired IR range is fused silica, crystal quartz, spinel, magnesium flouride, magnesium oxide, arsenic trisulfide glass, gallium arsenide, silicon, zinc selenide, zinc sulfide, or germanium.

16. The method of claim 1, wherein the desired IR range is short-range, mid-range, or long-range IR.

17. The method of claim 1, wherein the desired IR range is 3–5 µm.

18. The method of claim 1, wherein the polymer layer is a fluoropolymer.

19. The method of claim 8, wherein the fluoropolymer is polytetrafluorethylene, fluoroethylene propylene, polyvinylidine fluoride, per fluor alkoxy, or ethylene tetrafluoroethylene copolymer.

20. The method of claim 1, wherein the polymer layer is polyethylene.

* * * * *